United States Patent
Hill

(10) Patent No.: US 11,926,533 B2
(45) Date of Patent: Mar. 12, 2024

(54) METHODS OF MAKING HIGH Q MODIFIED BARIUM-BASED MATERIALS FOR HIGH FREQUENCY APPLICATIONS

(71) Applicant: Skyworks Solutions, Inc., Irvine, CA (US)

(72) Inventor: Michael David Hill, Emmitsburg, MD (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 17/671,450

(22) Filed: Feb. 14, 2022

(65) Prior Publication Data
US 2022/0169529 A1 Jun. 2, 2022

Related U.S. Application Data

(60) Division of application No. 16/384,217, filed on Apr. 15, 2019, now Pat. No. 11,274,046, which is a continuation of application No. 15/608,170, filed on May 30, 2017, now Pat. No. 10,308,522.

(60) Provisional application No. 62/343,295, filed on May 31, 2016.

(51) Int. Cl.
*C04B 35/495* (2006.01)
*C01G 35/00* (2006.01)
*C01G 41/00* (2006.01)
*H01B 3/12* (2006.01)

(52) U.S. Cl.
CPC .......... *C01G 35/006* (2013.01); *C01G 41/006* (2013.01); *C04B 35/495* (2013.01); *H01B 3/12* (2013.01); *C04B 2235/3206* (2013.01); *C04B 2235/3215* (2013.01); *C04B 2235/3255* (2013.01); *C04B 2235/326* (2013.01); *C04B 2235/768* (2013.01); *C04B 2235/77* (2013.01); *C04B 2235/80* (2013.01)

(58) Field of Classification Search
CPC .................................................. C04B 35/495
See application file for complete search history.

(56) References Cited

U.S. PATENT DOCUMENTS

| | | | |
|---|---|---|---|
| 5,506,552 | A | 4/1996 | Seki et al. |
| 5,721,519 | A | 2/1998 | Onishi et al. |
| 5,847,626 | A | 12/1998 | Taguchi et al. |
| 5,892,418 | A | 4/1999 | Onishi et al. |
| 5,959,516 | A | 9/1999 | Chang et al. |
| 5,994,985 | A | 11/1999 | Pehlke et al. |
| 6,232,847 | B1 | 5/2001 | Marcy et al. |
| 7,557,055 | B2 | 7/2009 | Zhang et al. |
| 7,572,748 | B1 | 8/2009 | Hill et al. |
| 7,875,567 | B2 | 1/2011 | Hill et al. |
| 7,960,302 | B2 | 6/2011 | Zhang et al. |
| 8,487,720 | B2 | 7/2013 | Fujiwara et al. |
| 8,835,339 | B2 | 9/2014 | Hill |
| 9,328,029 | B2 | 5/2016 | Hill |
| 9,413,330 | B2 | 8/2016 | Shimizu et al. |
| 10,097,159 | B2 | 10/2018 | Komatsu et al. |
| 10,308,522 | B2 | 6/2019 | Hill |
| 2009/0075119 | A1 | 3/2009 | Zhang et al. |
| 2009/0186753 | A1 | 7/2009 | Hill et al. |
| 2009/0264275 | A1 | 10/2009 | Hill et al. |
| 2010/0248937 | A1 | 9/2010 | Hill et al. |
| 2011/0215883 | A1 | 9/2011 | Fujiwara et al. |
| 2012/0329635 | A1 | 12/2012 | Hill |
| 2015/0065332 | A1 | 3/2015 | Hill |
| 2016/0056791 | A1 | 2/2016 | Shimizu et al. |
| 2016/0268997 | A1 | 9/2016 | Komatsu et al. |
| 2017/0341950 | A1 | 11/2017 | Hill |
| 2018/0315730 | A1 | 11/2018 | Gill et al. |
| 2019/0300378 | A1 | 10/2019 | Hill |

FOREIGN PATENT DOCUMENTS

| | | |
|---|---|---|
| JP | 05-198210 | 8/1993 |
| JP | 62-165804 | 8/1993 |

*Primary Examiner* — Karl E Group
(74) *Attorney, Agent, or Firm* — Knobbe, Martens, Olson & Bear, LLP

(57) ABSTRACT

Disclosed are embodiments of making a high Q ceramic material. The method includes providing $Ba_3NiTa_2O_9$ and incorporating one of $Ba_2MgWO_6$, $Ba_8LiTa_5WO_{24}$, $Ba_8LiTa_5WO_{24}$, $Ba_2MgWO_6$, $Ba_3LaTa_3O_{12}$, $Ba_8LiTa_5WO_{24}$, $BaLaLiWO_6$, $Ba_4Ta_2WO_{12}$, $Ba_2La_2MgW_2O_{12}$, $BaLaLiWO_6$, $Sr_3LaTa_3O_{12}$, and $SrLaTaO_{12}$ into the $Ba_3NiTa_2O_9$ to form a solid solution having a high Q value of greater than 12000 at about 10 GHz.

20 Claims, 11 Drawing Sheets

METHODS OF MAKING HIGH Q MODIFIED BARIUM-BASED MATERIALS FOR HIGH FREQUENCY APPLICATIONS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This disclosure generally relates to the use of modified barium magnesium tantalate to attain ultra-high Q values.

Description of the Related Art

There is a paucity of ceramic material solutions which have sufficient Q values for frequencies up to 10 GHz. However, as the wireless communication industry explores making use of frequency bands above 10 GHz in a quest for more spectrum, such as for 5G applications, there is a need for ceramic materials with sufficient Q values in these high frequencies for the formation of resonators and other filters.

Previous solutions were based on either barium zinc tantalate or barium magnesium tantalate though barium zinc tantalate does not have sufficient high frequency (6-10 GHz) Q values. On the other hand, barium magnesium tantalate has been shown to have acceptable Q values when doped with tin. However, tin is very difficult to process consistently due to its high volatility along with the high temperatures required for densification.

SUMMARY

Disclosed herein are embodiments of a high Q ceramic material comprising barium magnesium tantalate and one of a complex tungsten oxide compound, a hexagonal perovskite crystal structure, or a double perovskite crystal structure incorporated into the barium magnesium tantalate to form a composite material having a high Q value of greater than 12000 at about 10 GHz.

In some embodiments, the high Q ceramic material does not include tin. In some embodiments, the complex tungsten oxide can be incorporated into the barium magnesium tantalate. In some embodiments, between 3 wt. % and 5 wt. % of the complex tungsten oxide can be incorporated into the barium magnesium tantalate.

In some embodiments, the material can further include $MgTa_2O_6$ incorporated into the barium magnesium tantalate.

In some embodiments, the complex tungsten oxide compound, the hexagonal perovskite crystal structure, or the double perovskite crystal structure can be selected from the group consisting of $Ba_2MgWO_6$, $Ba_8LiTa_5WO_{24}$, $Ba_8LiTa_5WO_{24}$, $Ba_2MgWO_6$, $Ba_3LaTa_3O_{12}$, $Ba_8LiTa_5WO_{24}$, $BaLaLiWO_6$, $Ba_4Ta_2WO_{12}$, $Ba_2La_2MgW_2O_{12}$, $BaLaLiWO_6$, $Sr_3LaTa_3O_{12}$, and $SrLaTaO_{12}$.

In some embodiments, the hexagonal perovskite crystal structure can be incorporated into the barium magnesium tantalate. In some embodiments, about 5 wt. % of the hexagonal perovskite crystal structure can be incorporated into the barium magnesium tantalate. In some embodiments, the material can further include $MgTa_2O_6$ incorporated into the barium magnesium tantalate.

In some embodiments, the composite material can contain at least 95% barium magnesium tantalate. In some embodiments, the composite material can contain at least 97% barium magnesium tantalate.

In some embodiments, the composite material can have a dielectric constant of at least 25. The high Q ceramic material of claim 1 wherein the composite material has a Q value of greater than 17000 at about 10 GHz. In some embodiments, the composite material can include 95 wt. % $Ba_3MgTa_2O_9$+5 wt. % $Ba_4Ta_2WO_{12}$+0.2 weight % $MgTa_2O_6$ or 95 wt. % $Ba_3MgTa_2O_9$+5 wt. % $Ba_4Ta_2WO_{12}$+0.5 weight % $MgTa_2O_6$.

Also disclosed herein are embodiments of a method of making a high Q ceramic material comprising providing barium magnesium tantalate, and incorporating one of a complex tungsten oxide compound, a hexagonal perovskite crystal structure, or a double hexagonal perovskite crystal structure into the barium magnesium tantalate to form a solid solution having a high Q value of greater than 12000 at about 10 GHz.

Further disclosed herein are embodiments of a dielectric resonator or isolator for applications above 10 GHz, the dielectric resonator comprising barium magnesium tantalate and one of a complex tungsten oxide compound. a hexagonal perovskite crystal structure, or a double hexagonal perovskite crystal structure incorporated into the barium magnesium tantalate to form a composite material having a high Q value of greater than 12000 at 10 GHz. In some embodiments, the dielectric resonator can be configured to be used at frequencies of about 10 GHz and above.

Disclosed are embodiments of a cellular base station including the high Q ceramic material discussed herein. Disclosed are embodiments of a millimeter wave filter including the high Q ceramic material discussed herein. Disclosed are embodiments of a collision avoidance system including the high Q ceramic material discussed herein.

DETAILED DESCRIPTION

Disclosed herein are embodiments of ceramic materials, in particular doped or modified barium magnesium tantalate ceramic materials, which can have extremely high Q values. The advantageous properties of the ceramic materials can be achieved by doping the barium magnesium tantalate structure with small amounts of other materials, thus stabilizing the ceramic for use at high frequencies. The stabilization and high Q value achieved by embodiments of the disclosure can be advantageous for many different technologies, especially for radio frequency applications in the high frequency ranges (>10 GHz), 5G, and cellular communications. Further, embodiments of the disclosed material can be used for millimeter wave filters and collision avoidance systems. Additionally, the use of any tin in the material can be avoided, providing for easier and more consistent processing.

Figure 1:
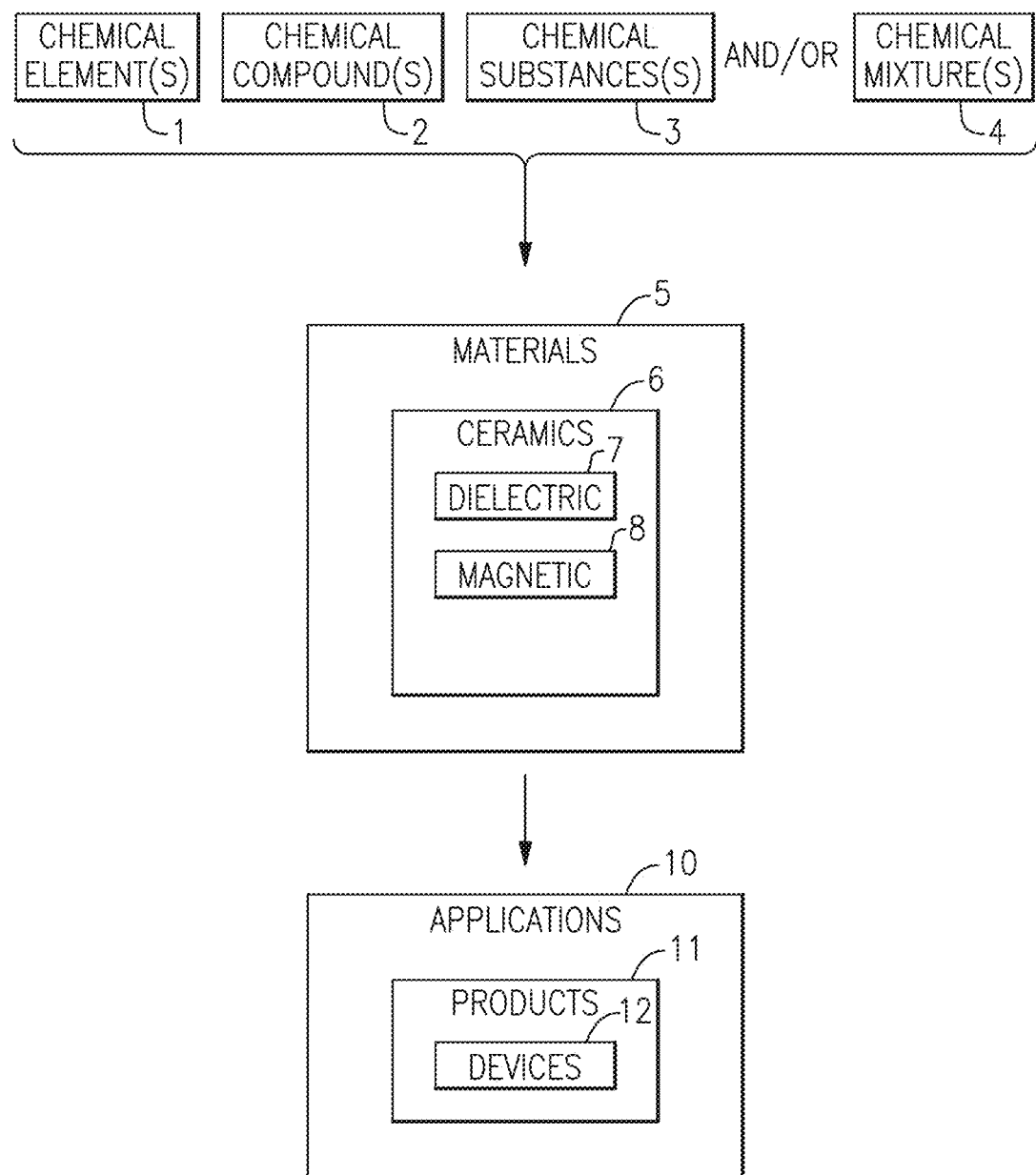
FIG. 1 schematically shows how materials having one or more features described herein can be designed, fabricated, and used.

FIG. 1 schematically shows how one or more chemical elements (block 1), chemical compounds (block 2), chemical substances (block 3) and/or chemical mixtures (block 4) can be processed to yield one or more materials (block 5) having one or more features described herein. In some embodiments, such materials can be formed into ceramic materials (block 6) configured to include a desirable dielectric property (block 7), a magnetic property (block 8) and/or an advanced material property (block 9).

In some embodiments, a material having one or more of the foregoing properties can be implemented in applications (block 10) such as radio-frequency (RF) application. Such applications can include implementations of one or more features as described herein in devices 12. In some applications, such devices can further be implemented in products 11. Examples of such devices and/or products are described herein.

Ultra-High Q Dielectric Materials

Embodiments of the disclosure can be used to prepare ceramic materials with ultra-high Q values, making them especially useful in the high frequency antenna field and for 5G applications.

In particular, barium magnesium tantalate, for example having the formula $Ba_3MgTa_2O_9$, $Ba_3NiTa_2O_9$, or $Ba_3CoTa_2O_9$, may be used as the base of the material. In some embodiments, the barium magnesium tantalate can have a 2:1 ordered hexagonal perovskite crystal structure, though the particular structure is not limiting. Other material(s) can then be incorporated into the crystal structure of the barium magnesium tantalate to improve the Q value of the final material, as well as to provide other advantageous properties. The other materials can be incorporated into the structure by altering the initial material mix or by separately synthesizing the base material and the additive material.

Embodiments of the disclosure can be particularly useful as tin (Sn) can be avoided, and thus the final composite material may include no tin. Previously, tin additives provided a way of stabilizing lossy anti-phase domains in barium magnesium tantalate. However, embodiments of the disclosure include tungstates with their cation vacancies diffuse to anti-phase domains stabilizing removing the dielectric losses caused by the anti-phase domains. Thus, tin is not needed to stabilize the lossy anti-phase domains. This advantageously improves manufacturing processing, as tin is highly volatile and difficult to process as at the extremely high firing temperatures required. Thus, non-tin additives can be incorporated into the barium magnesium tantalate to achieve high Q materials.

Accordingly, two methods of improving the Q values of barium magnesium tantalate are discussed below. The first is through the inclusion of complex tungsten oxide compounds. Example of this can include complex tungsten (III) oxide, tungsten (IV) oxide, and tungsten (VI). In some embodiments, complex tungsten oxide compounds can be defined as having a crystal structure of hexagonal perovskites which are B cation deficient relative to the stoichiometric perovskite structure. These can be incorporated into the base barium magnesium tantalate structure by altering the initial material mix or by separately synthesizing the base material and the additive material.

The second method is through the inclusion of materials having a double perovskite or hexagonal perovskite crystal structure. The double perovskite structure is so named because the unit cell of is twice that of perovskite. It has the same architecture of 12 coordinate A sites and 6 coordinate B sites, but two cations are ordered on the B site. Hexagonal perovskites can include hexagonal close packing structures.

Both the complex tungsten oxide and double/hexagonal perovskite crystal structure can modify the basic barium magnesium tantalate crystal structure by entering into solid solution with the barium magnesium tantalate. In some embodiments, multiple additional materials can be incorporated into the barium magnesium tantalate (such as both a complex oxide and a double/hexagonal perovskite crystal structure).

Accordingly, a number of different materials can be incorporated into a solid solution with the barium magnesium tantalate, such as, but not limited to, $Ba_2MgWO_6$, $Ba_8LiTa_5WO_{24}$, $Ba_8LiTa_5WO_{24}$, $Ba_2MgWO_6$, $Ba_3LaTa_3O_{12}$, $Ba_8LiTa_5WO_{24}$, $BaLaLiWO_6$, $Ba_4Ta_2WO_{12}$, $Ba_2La_2MgW_2O_{12}$, $BaLaLiWO_6$, $Sr_3LaTa_3O_{12}$, and $SrLaTaO_{12}$. In some embodiments, hexagonal perovskites which are B cation deficient relative to the stoichiometric perovskite structure could be used. However, it will be understood that other complex oxides and double/hexagonal perovskite crystal structures can be incorporated as well.

In some embodiments, 90 wt. % or greater (or about 90 wt. % or greater), 95 wt. % or greater (or about 95 wt. % or greater), 97 wt. % or greater (or about 97 wt. % or greater), or 99 wt. % or greater (or about 99 wt. % or greater) of barium magnesium tantalate can be the base material. For the additives, between 3 wt. % and 5 wt. % (or between about 3 wt. % and about 5 wt. %) of the materials can be incorporated into the barium magnesium tantalate.

Further, in some embodiments $MgTa_2O_6$ can be added into the barium magnesium tantalate along with the inclusions. This can be incorporated into the structure by altering the initial material mix or by separately synthesizing the base material and the additive material. This material may effectively make the barium magnesium tantalate barium deficient and can induce vacant cation sites in the perovskite structure. In some embodiments, between 0.1 and 0.6 wt. % of the $MgTa_2O_6$ can be added. In some embodiments, between 0.1 and 5.0 wt. % of the $MgTa_2O_6$ can be added.

Accordingly, embodiments of the disclosure can achieve high frequency Q values much greater than barium zinc tantalate based solutions (100000 at 10 GHz) and can be much easier to process than tin-doped barium magnesium tantalate based solutions. In particular, the added inclusions may be able to settle at lossy anti-phase domain boundaries and stabilize them so that they no longer become lossy at high frequencies.

Table I lists a number of different ceramic embodiments along with their respective properties. The barium magnesium tantalate listed in the table can also be replaced with the other barium magnesium tantalate embodiments discussed above.

TABLE I

Ceramic Material Formulations and Properties

| Formula | Density (g/cc) | Dielectric Constant | Temp. Coef. (ppm/° C.) | Q | Frequency (GHz) | QF Product (GHz) |
|---|---|---|---|---|---|---|
| 97 wt. % $Ba_3MgTa_2O_9$ + 3 wt. % $Ba_2MgWO_6$ | 7.28 | 23.19 | | 6436 | 10.86 | 69894.96 |
| 95 wt. % $Ba_3MgTa_2O_9$ + 5 wt. % $Ba_8LiTa_9WO_{24}$ | 7.62 | 24.94 | 1.7 | 11569 | 10.63 | 122978.47 |
| 95 wt. % $Ba_3MgTa_2O_9$ + 5 wt. % $Ba_4Ta_2WO_{12}$ | 7.6 | 24.72 | 0.75 | 11270 | 10.69 | 120476.3 |
| 95 wt. % $Ba_3MgTa_2O_9$ + 5 wt. % $Ba_3LaTa_3O_{12}$ | 7.62 | 25.71 | 13.7 | 14953 | 10.31 | 154165.43 |
| 95 wt. % $Ba_3MgTa_2O_9$ + 5 wt. % $BaLaLiWO_6$ | 6.81 | 21.3 | | 917 | | |
| 95 wt. % $Ba_3MgTa_2O_9$ + 5 wt. % $Ba_2La_2MgW_2O_{12}$ | 6.79 | 21.25 | 14.53 | 5585 | | |
| 95 wt. % $Ba_3MgTa_2O_9$ + 5 wt. % $Sr_3LaTa_3O_{12}$ | 7.58 | 25.62 | 19.31 | 10303 | 10.3 | 106120.9 |

Accordingly, the above Table I illustrates different properties of embodiments of the disclosed high Q materials at frequencies of 10 GHz (or frequencies of about 10 GHz). Q is the quality factor at a particular frequency (listed in the table) and Qf product is the Q value multiplied by the particular frequency listed in the table.

In some embodiments, the material can achieve a Qf of greater than 100000 (or greater than about 100000). In some embodiments, the material can achieve a Qf of greater than 125000 (or greater than about 125000). In some embodiments, the material can achieve a Qf of greater than 150000 (or greater than about 150000). In some embodiments, the material can achieve a Qf of greater than 175000 (or greater than about 175000). In some embodiments, the material can achieve a Qf of less than 200000 (or greater than about 200000). In some embodiments, the material can achieve a Qf of less than 190000 (or greater than about 190000). In some embodiments, the material can achieve a Qf of less than 180000 (or greater than about 180000). The Qfs described in this paragraph are for a frequency of about 10 GHz. The frequency can range from about 10 to about 11 GHz.

In some embodiments, the material can have a Q of greater than 10000 (or greater than about 10000). In some embodiments, the material can have a Q of greater than 12000 (or greater than about 12000). In some embodiments, the material can have a Q of greater than 14000 (or greater than about 14000). In some embodiments, the material can have a Q of greater than 16000 (or greater than about 16000). In some embodiments, the material can have a Q of greater than 18000 (or greater than about 18000). In some embodiments, the material can have a Q of greater less than 20000 (or less than about 20000). In some embodiments, the material can have a Q of greater less than 19000 (or less than about 19000). In some embodiments, the material can have a Q of greater less than 18000 (or less than about 18000).

In some embodiments, the material can have a temperature coefficient of between −20 ppm/deg. C. to +20 ppm/deg. C. (or between about −20 ppm/deg. C. to about +20 ppm/deg. C.). In some embodiments, the material can have a temperature coefficient of between −15 ppm/deg. C. to +15 ppm/deg. C. (or between about −15 ppm/deg. C. to about +15 ppm/deg. C.). In some embodiments, the material can have a temperature coefficient of between −10 ppm/deg. C. to +10 ppm/deg. C. (or between about −10 ppm/deg. C. to about +10 ppm/deg. C.). In some embodiments, the material can have a temperature coefficient of between −5 ppm/deg. C. to +5 ppm/deg. C. (or between about −5 ppm/deg. C. to about +5 ppm/deg. C.). In some embodiments, the material can have a temperature coefficient of between −1 ppm/deg. C. to +1 ppm/deg. C. (or between about −1 ppm/deg. C. to about +1 ppm/deg. C.).

Thus, as shown in the above table, embodiments of the disclosure can have high dielectric constants and Q values, making the material particularly suitable for high frequency applications. In some embodiments, the material can have a Qf of 200,000 or greater. In particular, embodiments of the disclosure can be used as dielectric resonators, in particular to frequencies >10 GHz. Further, embodiments of the disclosure can be used as millimeter wave filters and for collision avoidance systems.

Embodiments of the disclosure can be used in collision avoidance systems as a filter for high frequency, short range signals typically in the 10-100 GHz range used for modern collision avoidance systems.

Further, embodiments of the material can be incorporated into millimeter wave filters operating at frequencies of 10 GHz or above (whereas most microwave filters operate from 700 MHz to 3 GHz). Thus, embodiments of the disclosure can be advantageous in the 3-6 GHz range, such as for 5G cellular systems. 5G technology is also referred to as 5G New Radio (NR). Additionally, the material can have applications for millimeter wave (mmW) frequencies/communications at 6 GHz and above. In some embodiments, it may be useful for frequencies such as 26 GHz and above. In some embodiments, communications systems using millimeter wave carries can operate at frequencies of between 30 GHz to 300 GHz.

Preliminary specifications for 5G NR support a variety of features, such as communications over millimeter wave spectrum, beam forming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

Figure 2:
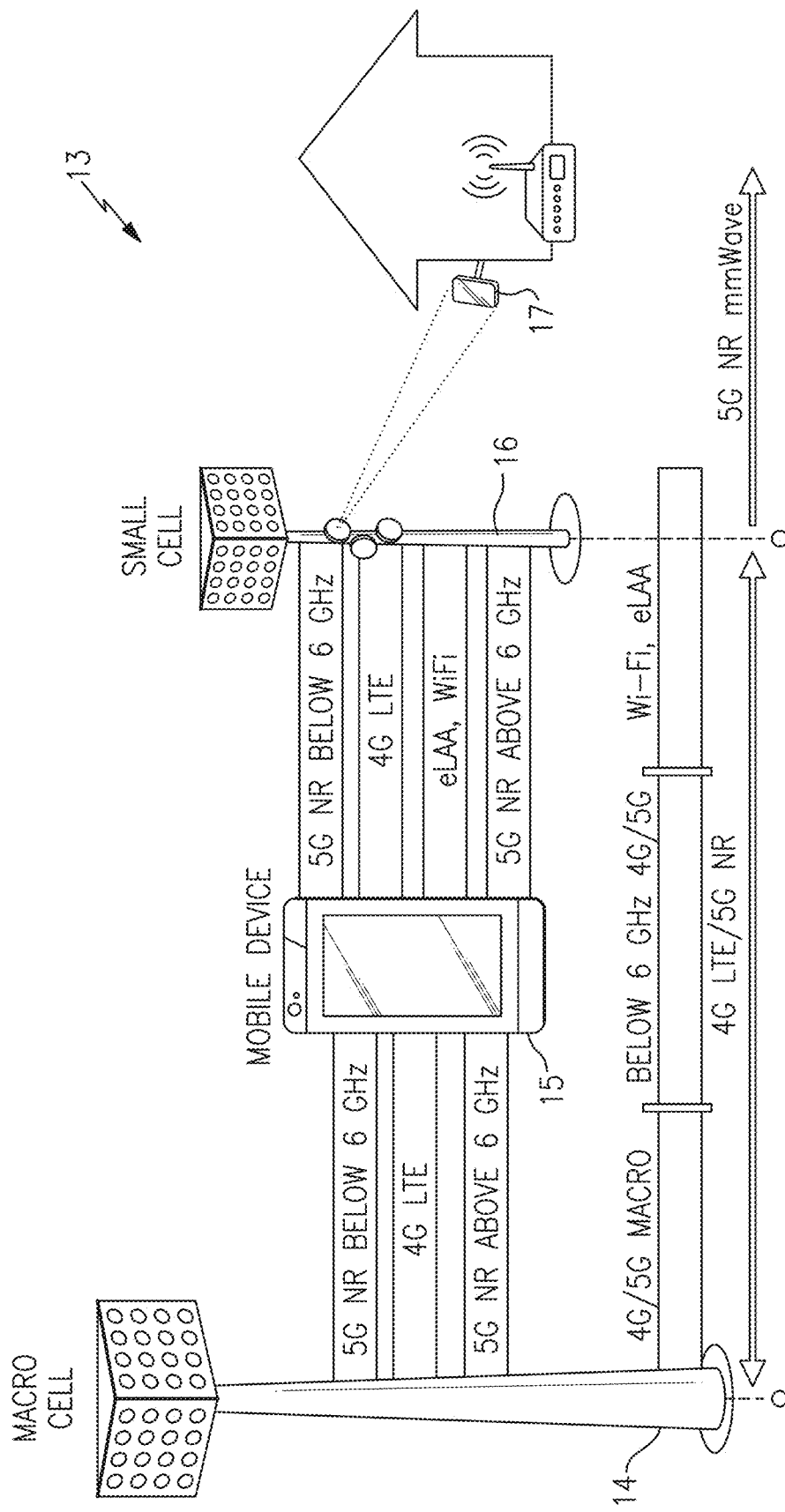
FIG. 2 is a schematic design of one embodiment of a communication network.

FIG. 2 is a schematic diagram of one example of a communication network 13. The communication network 13 includes a macro cell base station 14, a mobile device 15, a small cell base station 16, and a stationary wireless device 17. The material disclosed herein can be incorporated into a number of components of the network, including the base stations and devices. For example, as discussed below, embodiments of the material can be formed into a resonator for incorporation into a wireless network.

The illustrated communication network 13 of FIG. 2 supports communications using a variety of technologies, including, for example, 4G LTE, 5G NR, and wireless local area network (WLAN), such as Wi-Fi. Although various examples of supported communication technologies are shown, the communication network 13 can be adapted to support a wide variety of communication technologies.

As shown in FIG. 2, the mobile device 15 communicates with the macro cell base station 14 over a communication link that uses a combination of 4G LTE and 5G NR technologies. The mobile device 15 also communications with the small cell base station 16. In the illustrated example, the mobile device 15 and small cell base station 16 communicate over a communication link that uses 5G NR, 4G LTE, and Wi-Fi technologies.

In certain implementations, the mobile device 15 communicates with the macro cell base station 14 and the small cell base station 16 using 5G NR technology over one or more frequency bands that are less than 6 Gigahertz (GHz). In one embodiment, the mobile device 15 supports a HPUE power class specification.

The illustrated small cell base station 16 also communicates with a stationary wireless device 17. The small cell base station 16 can be used, for example, to provide broadband service using 5G NR technology over one or more frequency bands above 6 GHz, including, for example, millimeter wave bands in the frequency range of 30 GHz to 300 GHz.

In certain implementations, the small cell base station 16 communicates with the stationary wireless device 17 using beamforming. For example, beamforming can be used to focus signal strength to overcome path losses, such as high loss associated with communicating over millimeter wave frequencies.

The communication network 13 of FIG. 2 includes the macro cell base station 14 and the small cell base station 16. In certain implementations, the small cell base station 16 can operate with relatively lower power, shorter range, and/or with fewer concurrent users relative to the macro cell base station 14. The small cell base station 16 can also be referred to as a femtocell, a picocell, or a microcell.

Although the communication network 13 is illustrated as including two base stations, the communication network 13 can be implemented to include more or fewer base stations and/or base stations of other types.

The communication network 13 of FIG. 2 is illustrated as including one mobile device 15 and one stationary wireless device 17. The mobile device 15 and the stationary wireless device 17 illustrate two examples of user devices or user equipment (UE). Although the communication network 13 is illustrated as including two user devices, the communication network 13 can be used to communicate with more or fewer user devices and/or user devices of other types. For example, user devices can include mobile phones, tablets, laptops, IoT devices, wearable electronics, and/or a wide variety of other communications devices.

User devices of the communication network 13 can share available network resources (for instance, available frequency spectrum) in a wide variety of ways.

Preparation of the Composite Ceramic Materials:

The preparation of embodiments of the above-discussed composite materials can be accomplished by using known ceramic techniques. A particular example of the process flow is illustrated in FIG. 3.

Figure 3:
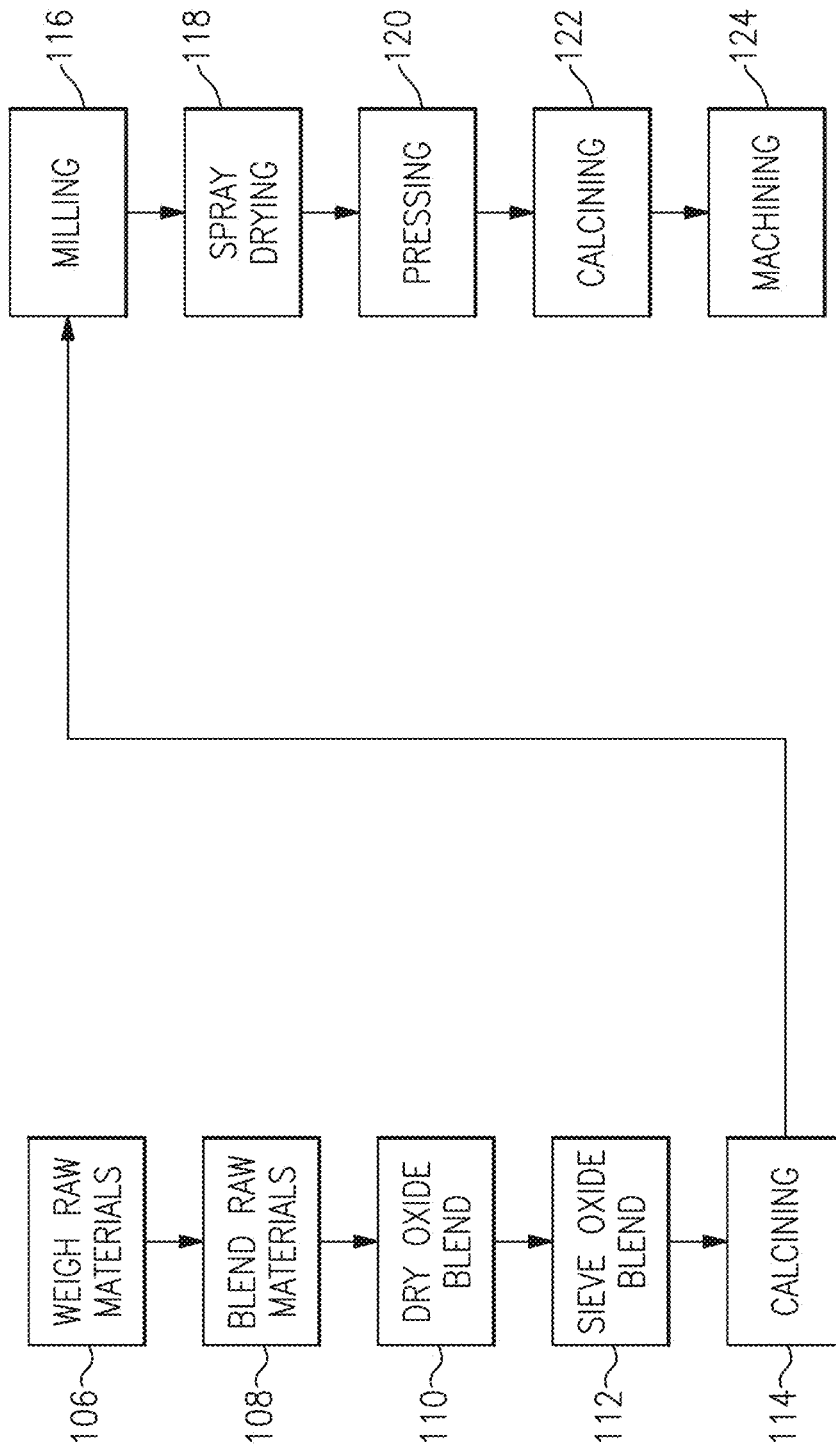
FIG. 3 illustrates an example process flow for making an embodiment of a composite ceramic material having one or more features described herein.

As shown in FIG. 3, the process begins with step 106 for weighing the raw material. The raw material may include barium carbonate, magnesium oxide, tantalum pentoxide and other oxides from the "additive" compounds such as lithium carbonate and tungsten oxide. In addition, organic based materials may be used in a sol gel process for ethoxides and/or acrylates or citrate based techniques may be employed. Other known methods in the art such as co-precipitation of hydroxides, sol-gel, or laser ablation may also be employed as a method to obtain the materials. The amount and selection of raw material depends on the specific formulation.

After the raw materials are weighed, they are blended in Step 108 using methods consistent with the current state of the ceramic art, which can include aqueous blending using a mixing propeller, or aqueous blending using a vibratory mill with steel or zirconia media. In some embodiments, a glycine nitrate or spray pyrolysis technique may be used for blending and simultaneously reacting the raw materials.

The blended oxide is subsequently dried in Step 110, which can be accomplished by pouring the slurry into a pane and drying in an oven, preferably between 100-400° C. or by spray drying, or by other techniques known in the art.

The dried oxide blend is processed through a sieve in Step 112, which homogenizes the powder and breaks up soft agglomerates that may lead to dense particles after calcining.

The material is subsequently processed through a pre-sintering calcining in Step 114. Preferably, the material is loaded into a container such as an alumina or cordierite sagger and heat treated in the range of about 800-1600° C.

After calcining, the material is milled in Step 116, preferably in a vibratory mill, an attrition mill, a jet mill or other standard comminution technique to reduce the median particle size into the range of about 0.1 to 10.0 microns, though in some embodiments larger or smaller sizes may be used as well. Milling is preferably done in a water based slurry but may also be done in ethyl alcohol or another organic based solvent.

The material is subsequently spray dried in Step 118. During the spray drying process, organic additives such as binders and plasticizers can be added to the slurry using techniques known in the art. The material is spray dried to provide granules amenable to pressing, preferably in the range of about 10 microns to 150 microns in size.

The spray dried granules are subsequently pressed in Step 120, preferably by uniaxial or isostatic pressing to achieve a pressed density to as close to 60% of the x-ray theoretical density as possible. In addition, other known methods such as tape casting, tape calendaring or extrusion may be employed as well to form the unfired body.

The pressed material is subsequently processed through a calcining process in Step 122. Preferably, the pressed material is placed on a setter plate made of material such as alumina which does not readily react with the garnet material. The setter plate is heated in a periodic kiln or a tunnel kiln in air or pressure oxygen in the range of between about 850° C.-1600° C. to obtain a dense ceramic compact. Other known treatment techniques, such as induction heat, hot pressing, fast firing, or assisted fast firing, may also be used in this step. In some embodiments, a density having >98% of the theoretical density can be achieved.

The dense ceramic compact is machined in the Step 124 to achieve dimensions suitable or the particular applications.

Fabrication of Radiofrequency Devices

Figure 4:
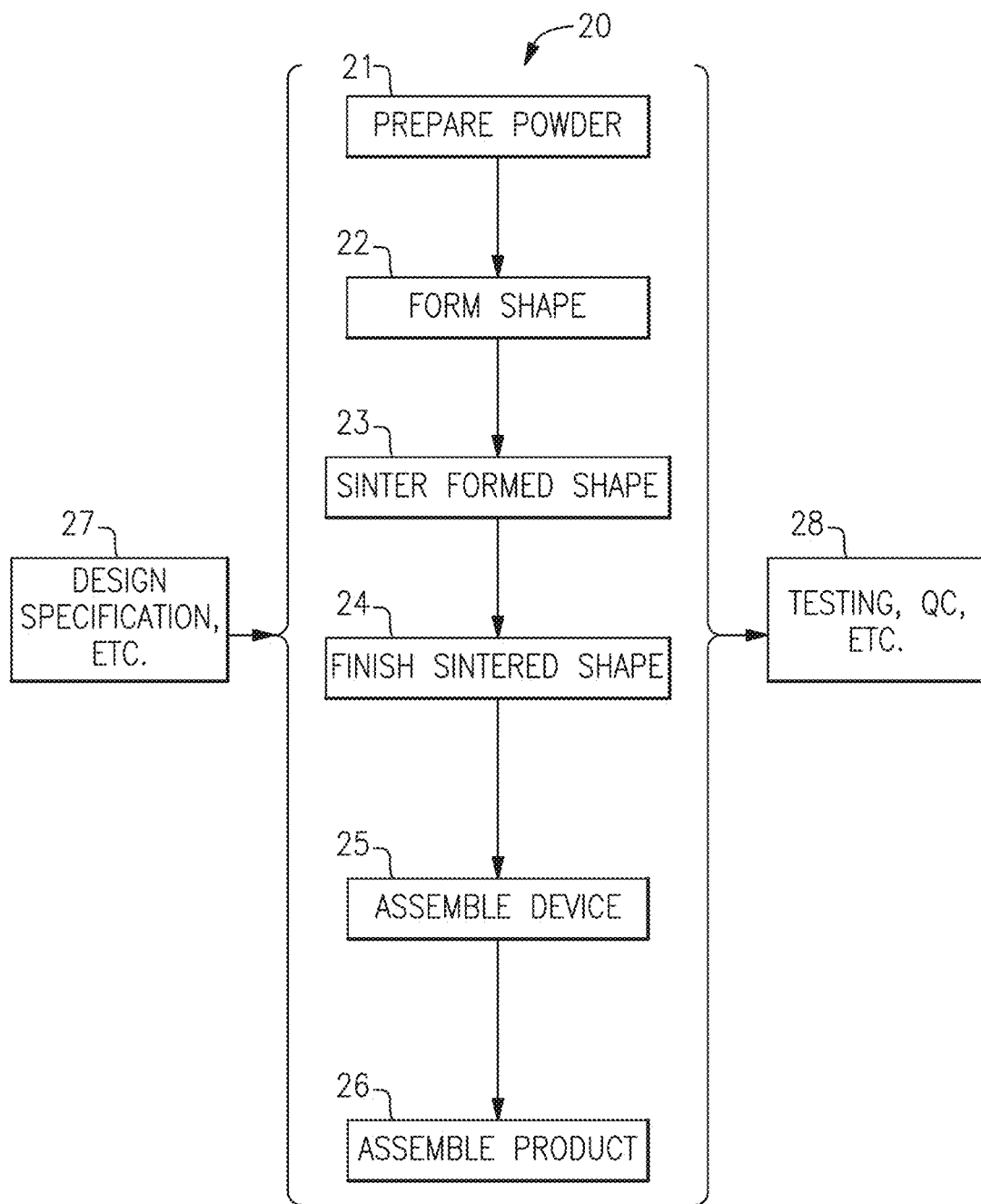
FIG. 4 shows a process that can be implemented to fabricate a composite ceramic material having one or more features as described herein.

FIGS. 4-8 show examples of how radiofrequency devices having one or more features as described herein can be fabricated. FIG. 4 shows a process 20 that can be implemented to fabricate a ceramic material having one or more of the foregoing properties. In block 21, powder can be prepared. In block 22, a shaped object can be formed from the prepared powder. In block 23, the formed object can be sintered. In block 24, the sintered object can be finished to yield a finished ceramic object having one or more desirable properties.

In implementations where the finished ceramic object is part of a device, the device can be assembled in block 25. In implementations where the device or the finished ceramic object is part of a product, the product can be assembled in block 26.

FIG. 4 further shows that some or all of the steps of the example process 20 can be based on a design, specification, etc. Similarly, some or all of the steps can include or be subjected to testing, quality control, etc.

In some implementations, the powder preparation step (block 21) of FIG. 4 can be performed by the example process described in reference to FIG. 3. Powder prepared in such a manner can include one or more properties as described herein, and/or facilitate formation of ceramic objects having one or more properties as described herein.

Figure 5:
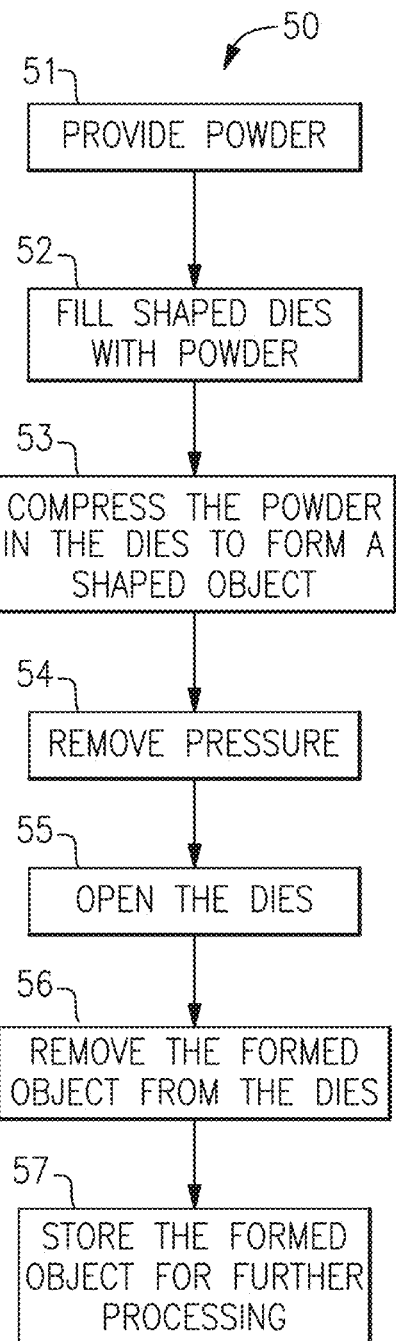
FIG. 5 shows a process that can be implemented to form a shaped object from powder material described herein.
Figure 6:
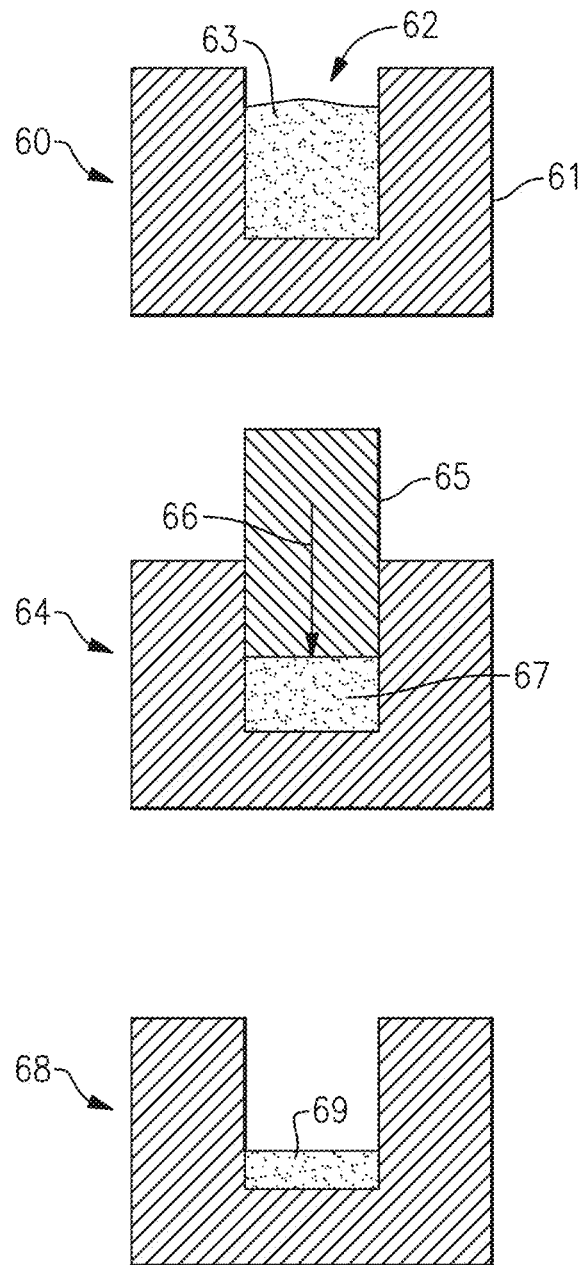
FIG. 6 shows examples of various stages of the process of FIG. 5.

In some implementations, powder prepared as described herein can be formed into different shapes by different forming techniques. By way of examples, FIG. 5 shows a process 50 that can be implemented to press-form a shaped object from a powder material prepared as described herein. In block 52, a shaped die can be filled with a desired amount of the powder. In FIG. 6, configuration 60 shows the shaped die as 61 that defines a volume 62 dimensioned to receive the powder 63 and allow such power to be pressed. In block 53, the powder in the die can be compressed to form a shaped object. Configuration 64 shows the powder in an intermediate compacted form 67 as a piston 65 is pressed (arrow 66) into the volume 62 defined by the die 61. In block 54, pressure can be removed from the die. In block 55, the piston (65) can be removed from the die (61) so as to open the volume (62). Configuration 68 shows the opened volume (62) of the die (61) thereby allowing the formed object 69 to be removed from the die. In block 56, the formed object (69) can be removed from the die (61). In block 57, the formed object can be stored for further processing.

Figures 7, 8:
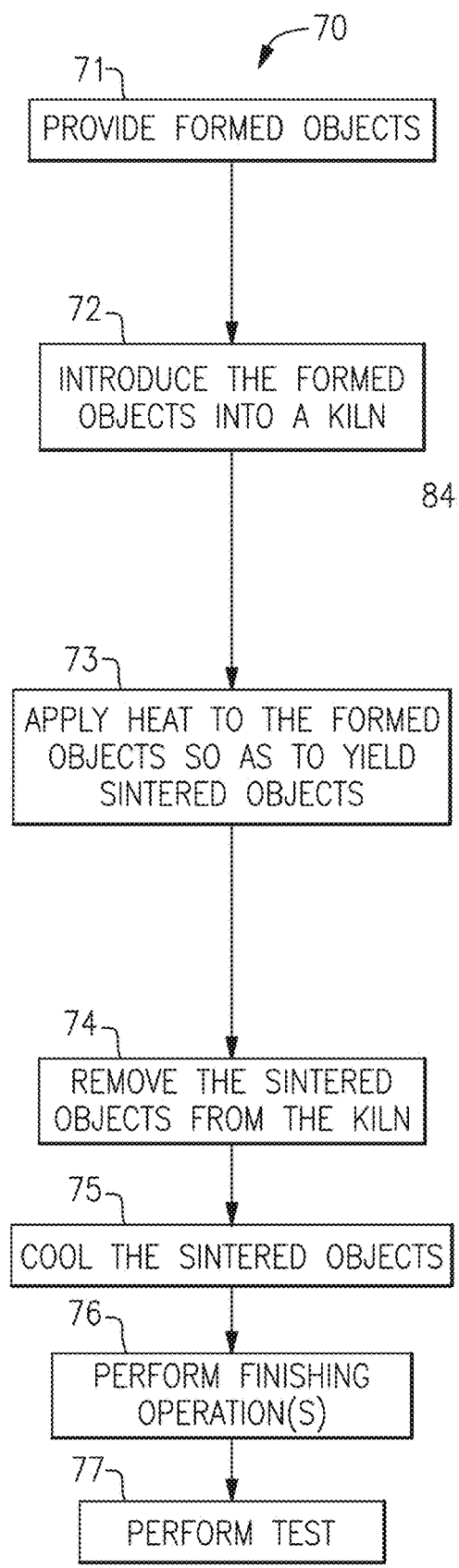
FIG. 7 shows a process that can be implemented to sinter formed objects such as those formed in the example of FIGS. 5 and 6.
FIG. 8 shows examples of various stages of the process of FIG. 7.

In some implementations, formed objects fabricated as described herein can be sintered to yield desirable physical properties as ceramic devices. FIG. 7 shows a process 70 that can be implemented to sinter such formed objects. In block 71, formed objects can be provided. In block 72, the formed objects can be introduced into a kiln. In FIG. 8, a plurality of formed objects 69 are shown to be loaded into a sintering tray 80. The example tray 80 is shown to define a recess 83 dimensioned to hold the formed objects 69 on a surface 82 so that the upper edge of the tray is higher than the upper portions of the formed objects 69. Such a configuration allows the loaded trays to be stacked during the sintering process. The example tray 80 is further shown to define cutouts 83 at the side walls to allow improved circulation of hot gas at within the recess 83, even when the trays are stacked together. FIG. 8 further shows a stack 84 of a plurality of loaded trays 80. A top cover 85 can be provided so that the objects loaded in the top tray generally experience similar sintering condition as those in lower trays.

In block 73, heat can be applied to the formed objects so as to yield sintered objects. Such application of heat can be achieved by use of a kiln. In block 74, the sintered objects can be removed from the kiln. In FIG. 8, the stack 84 having a plurality of loaded trays is depicted as being introduced into a kiln 87 (stage 86*a*). Such a stack can be moved through the kiln (stages 86*b*, 86*c*) based on a desired time and temperature profile. In stage 86*d*, the stack 84 is depicted as being removed from the kiln so as to be cooled.

In block 75, the sintered objects can be cooled. Such cooling can be based on a desired time and temperature profile. In block 206, the cooled objects can undergo one or more finishing operations. In block 207, one or more tests can be performed.

Heat treatment of various forms of powder and various forms of shaped objects are described herein as calcining, firing, annealing, and/or sintering. It will be understood that such terms may be used interchangeably in some appropriate situations, in context-specific manners, or some combination thereof.

Application of the Material

Figure 9:
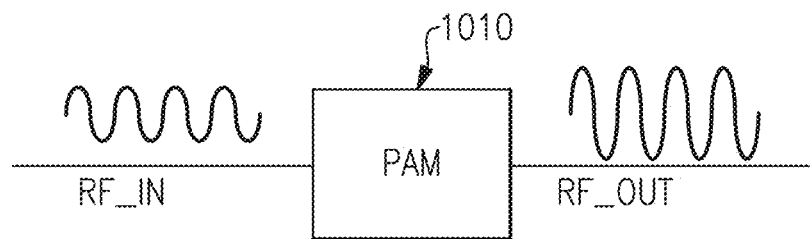
FIG. 9 illustrates an embodiment of a power amplifier module which can use embodiments of the disclosed material.
Figure 10:
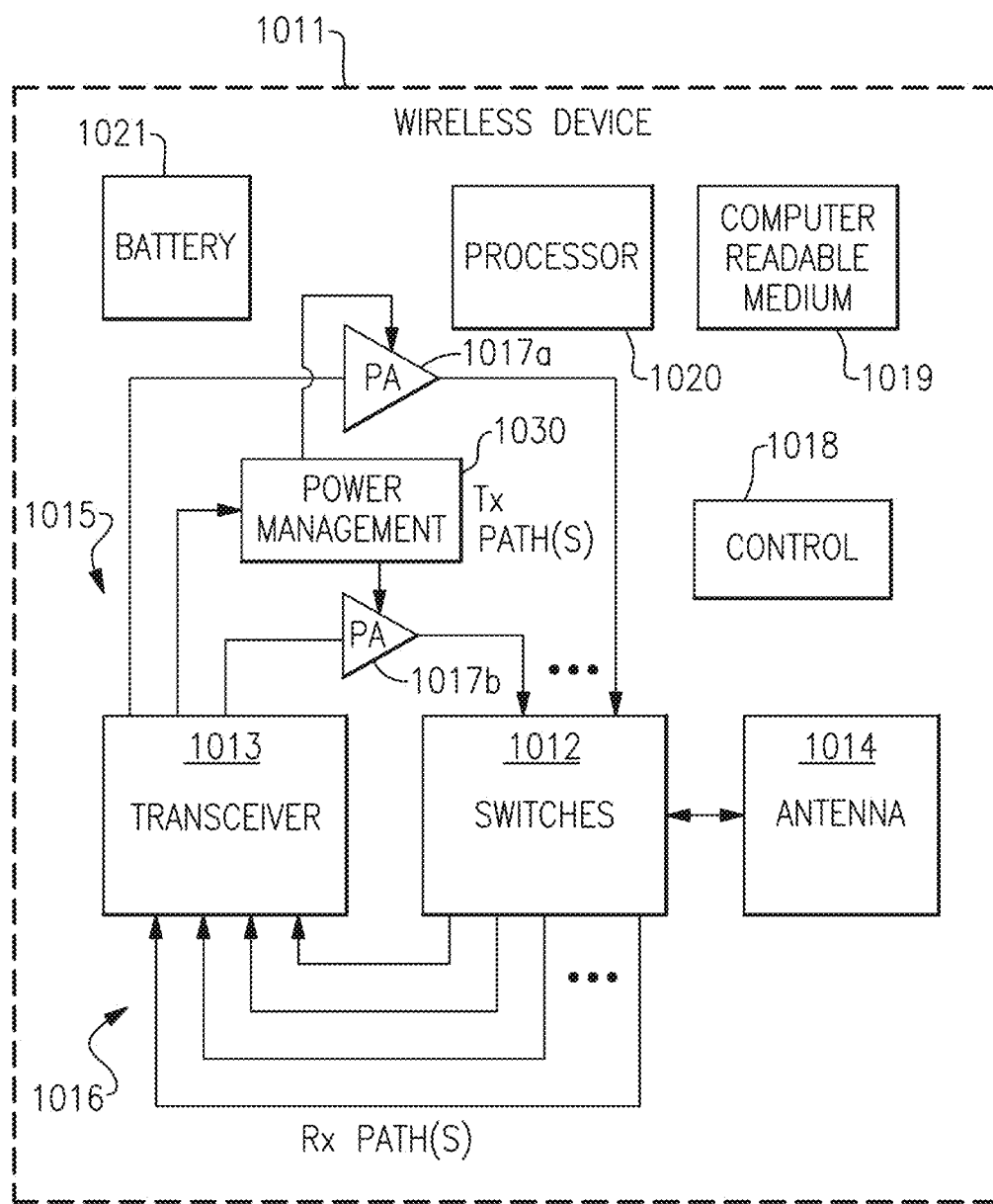
FIG. 10 illustrates an embodiment of a wireless device which can use embodiments of the disclosed material.

FIGS. 9 and 10 respectively illustrate a power amplifier module 1010 and wireless device 1011 which can include one or more radio frequency devices implemented using any of the methods, materials, and devices of the present disclosure. For instance, the power amplifier module 1010 and the wireless device 1011 can include one or more antennas, transformers, inductors, circulators, absorbers, or other RF devices or other devices implemented according to the present disclosure, including devices incorporating an embodiment of the disclosed composite ceramic.

FIG. 9 is a schematic diagram of a power amplifier module (PAM) 1010 for amplifying a radio frequency (RF) signal. The illustrated power amplifier module 1010 amplifies an RF signal (RF_IN) to generate an amplified RF signal (RF_OUT).

FIG. 10 is a schematic block diagram of an example wireless or mobile device 1011. The example wireless device 1011 depicted in FIG. 10 can represent a multi-band and/or multi-mode device such as a multi-band/multi-mode mobile phone. By way of examples, Global System for Mobile (GSM) communication standard is a mode of digital cellular communication that is utilized in many parts of the world. GSM mode mobile phones can operate at one or more of four frequency bands: 850 MHz (approximately 824-849 MHz for Tx, 869-894 MHz for Rx), 900 MHz (approximately 880-915 MHz for Tx, 925-960 MHz for Rx), 1800 MHz (approximately 1710-1785 MHz for Tx, 1805-1880 MHz for Rx), and 1900 MHz (approximately 1850-1910 MHz for Tx, 1930-1990 MHz for Rx). Variations and/or regional/national implementations of the GSM bands are also utilized in different parts of the world.

Code division multiple access (CDMA) is another standard that can be implemented in mobile phone devices. In certain implementations, CDMA devices can operate in one or more of 800 MHz, 900 MHz, 1800 MHz and 1900 MHz bands, while certain W-CDMA and Long Term Evolution (LTE) devices can operate over, for example, 22 or more radio frequency spectrum bands.

One or more features of the present disclosure can be implemented in the foregoing example modes and/or bands, and in other communication standards. For example, 802.11, 2G, 3G, 4G, LTE, and Advanced LTE are non-limiting examples of such standards. To increase data rates, the wireless device 1011 can operate using complex modulated signals, such as 64 QAM signals.

In certain embodiments, the wireless device 1011 can include switches 1012, a transceiver 1013, an antenna 1014, power amplifiers 1017a, 1017b, a control component 1018, a computer readable medium 1019, a processor 1020, a battery 1021, and a power management system 1030, any of which can include embodiments of the disclosed material.

The transceiver 1013 can generate RF signals for transmission via the antenna 1014. Furthermore, the transceiver 1013 can receive incoming RF signals from the antenna 1014.

It will be understood that various functionalities associated with the transmission and receiving of RF signals can be achieved by one or more components that are collectively represented in FIG. 10 as the transceiver 1013. For example, a single component can be configured to provide both transmitting and receiving functionalities. In another example, transmitting and receiving functionalities can be provided by separate components.

Similarly, it will be understood that various antenna functionalities associated with the transmission and receiving of RF signals can be achieved by one or more components that are collectively represented in FIG. 10 as the antenna 1014. For example, a single antenna can be configured to provide both transmitting and receiving functionalities. In another example, transmitting and receiving functionalities can be provided by separate antennas. In yet another example, different bands associated with the wireless device 1011 can operate using different antennas.

In FIG. 10, one or more output signals from the transceiver 1013 are depicted as being provided to the antenna 1014 via one or more transmission paths 1015. In the example shown, different transmission paths 1015 can represent output paths associated with different bands and/or different power outputs. For instance, the two example power amplifiers 1017a, 1017b shown can represent amplifications associated with different power output configurations (e.g., low power output and high power output), and/or amplifications associated with different bands. Although FIG. 10 illustrates a configuration using two transmission paths 1015 and two power amplifiers 1017a, 1017b, the wireless device 1011 can be adapted to include more or fewer transmission paths 1015 and/or more or fewer power amplifiers.

In FIG. 10, one or more detected signals from the antenna 1014 are depicted as being provided to the transceiver 1013 via one or more receiving paths 1016. In the example shown, different receiving paths 1016 can represent paths associated with different bands. For example, the four example receiving paths 1016 shown can represent quad-band capability that some wireless devices are provided with. Although FIG. 10 illustrates a configuration using four receiving paths 1016, the wireless device 1011 can be adapted to include more or fewer receiving paths 1016.

To facilitate switching between receive and transmit paths, the switches 1012 can be configured to electrically connect the antenna 1014 to a selected transmit or receive path. Thus, the switches 1012 can provide a number of switching functionalities associated with operation of the wireless device 1011. In certain embodiments, the switches 1012 can include a number of switches configured to provide functionalities associated with, for example, switching between different bands, switching between different power modes, switching between transmission and receiving modes, or some combination thereof. The switches 1012 can also be configured to provide additional functionality, including filtering and/or duplexing of signals.

FIG. 10 shows that in certain embodiments, a control component 1018 can be provided for controlling various control functionalities associated with operations of the switches 1012, the power amplifiers 1017a, 1017b, the power management system 1030, and/or other operating components.

In certain embodiments, a processor 1020 can be configured to facilitate implementation of various processes described herein. The processor 1020 can implement various computer program instructions. The processor 1020 can be a general purpose computer, special purpose computer, or other programmable data processing apparatus.

In certain embodiments, these computer program instructions may also be stored in a computer-readable memory 1019 that can direct the processor 1020 to operate in a particular manner, such that the instructions stored in the computer-readable memory 1019.

The illustrated wireless device 1011 also includes the power management system 1030, which can be used to provide power amplifier supply voltages to one or more of the power amplifiers 1017a, 1017b. For example, the power management system 1030 can be configured to change the supply voltages provided to the power amplifiers 1017a, 1017b to improve efficiency, such as power added efficiency (PAE). The power management system 1030 can be used to provide average power tracking (APT) and/or envelope tracking (ET). Furthermore, as will be described in detail further below, the power management system 1030 can include one or more low dropout (LDO) regulators used to generate power amplifier supply voltages for one or more stages of the power amplifiers 1017a, 1017b. In the illustrated implementation, the power management system 1030 is controlled using a power control signal generated by the transceiver 1013. In certain configurations, the power control signal is provided by the transceiver 1013 to the power management system 1030 over an interface, such as a serial peripheral interface (SPI) or Mobile Industry Processor Interface (MIPI).

In certain configurations, the wireless device 1011 may operate using carrier aggregation. Carrier aggregation can be used for both Frequency Division Duplexing (FDD) and Time Division Duplexing (TDD), and may be used to aggregate a plurality of carriers or channels, for instance up to five carriers. Carrier aggregation includes contiguous aggregation, in which contiguous carriers within the same operating frequency band are aggregated. Carrier aggregation can also be non-contiguous, and can include carriers separated in frequency within a common band or in different bands.

Telecommunication Base Station

Circuits and devices having one or more features as described herein can be implemented in RF applications such as a wireless base-station. Such a wireless base-station can include one or more antennas configured to facilitate transmission and/or reception of RF signals. Such antenna(s) can be coupled to circuits and devices having one or more circulators/isolators as described herein.

Figure 11:
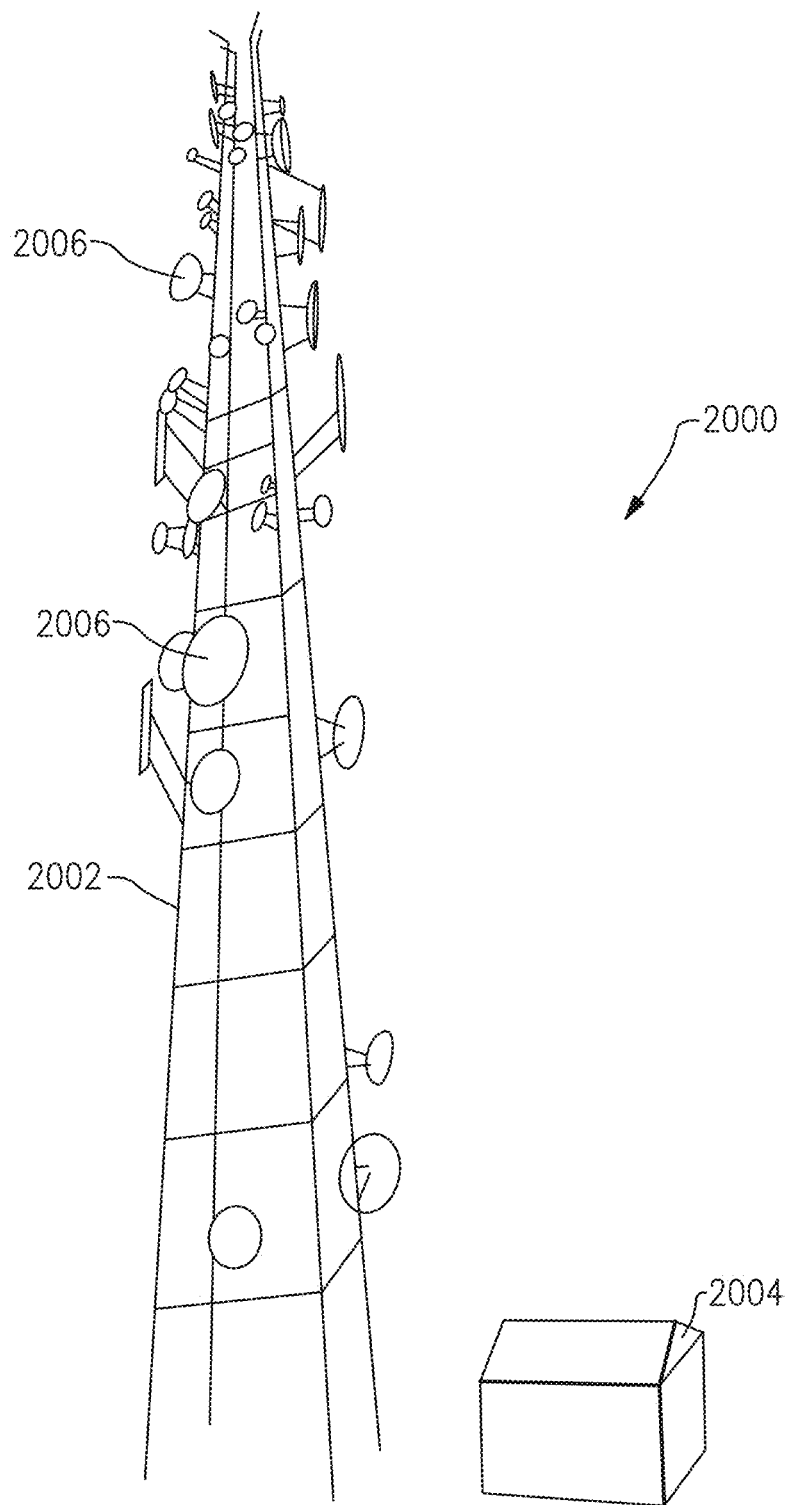
FIG. 11 illustrates a perspective view of a cellular antenna base station incorporating embodiments of the disclosure.

Thus, in some embodiments, the above disclosed material can be incorporated into different components of a telecommunication base station, such as used for cellular networks and wireless communications. An example perspective view of a base station 2000 is shown in FIG. 11, including both a cell tower 2002 and electronics building 2004. The cell tower 2002 can include a number of antennas 2006, typically facing different directions for optimizing service, which can be used to both receive and transmit cellular signals while the electronics building 2004 can hold electronic components such as filters, amplifiers, etc. discussed below. Both the antennas 2006 and electronic components can incorporate embodiments of the disclosed ceramic materials.

Figure 12:
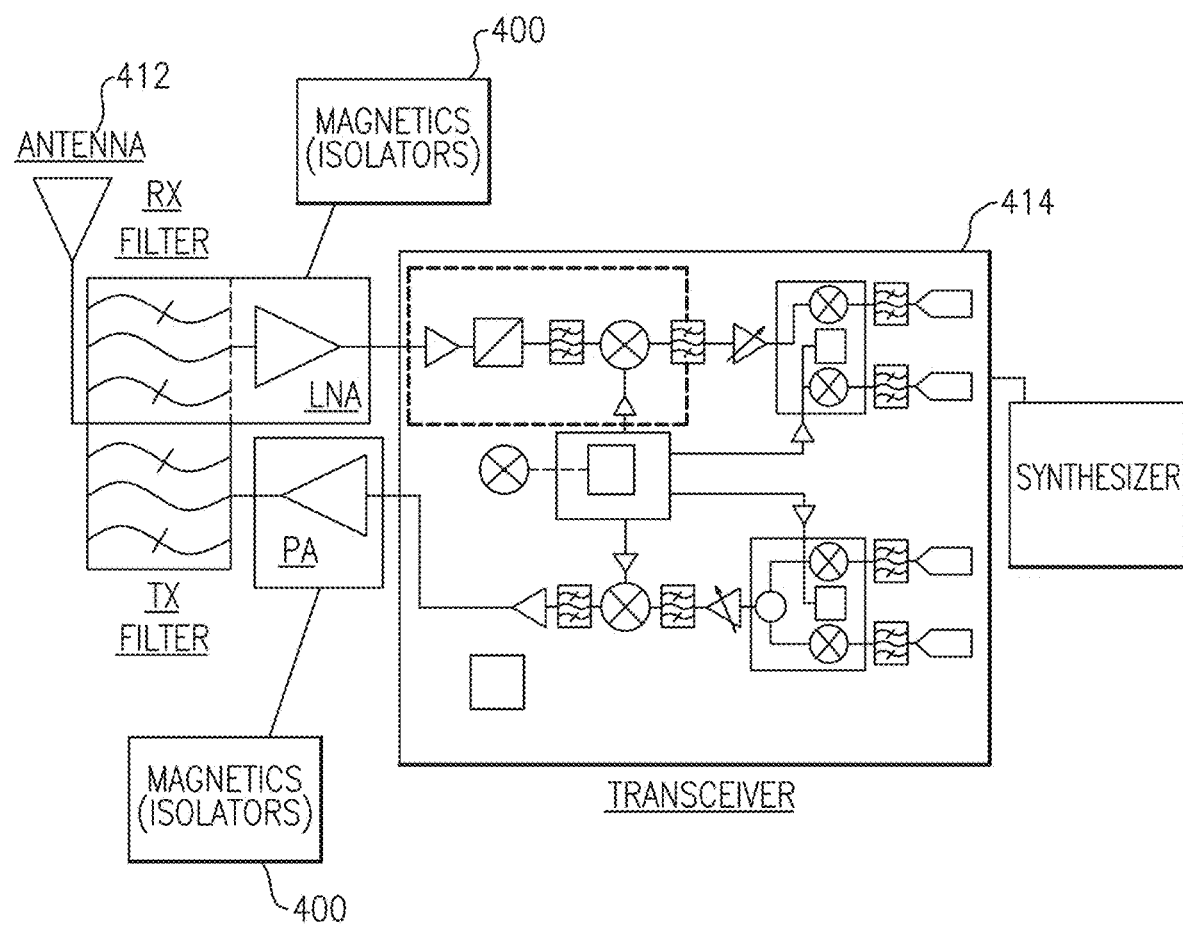
FIG. 12 illustrates a schematic of a telecommunication base station system incorporating an embodiment of a composite ceramic material disclosed herein.

FIG. 12 shows a schematic view of a base station such as shown in FIG. 11. As shown, the base station can include an antenna 412 that is configured to facilitate transmission and/or reception of RF signals. Such signals can be generated by and/or processed by a transceiver 414. For transmission, the transceiver 414 can generate a transmit signal that is amplified by a power amplifier (PA) and filtered (Tx Filter) for transmission by the antenna 412. For reception, a signal received from the antenna 412 can be filtered (Rx Filter) and amplified by a low-noise amplifier (LNA) before being passed on to the transceiver 414. In the example context of such Tx and Rx paths, circulators and/or isolators 400 having one or more features as described herein can be implemented at or in connection with, for example, the PA circuit and the LNA circuit. The circulators and isolators can include embodiments of the material disclosed herein. Further, the antennas can include the materials disclosed herein, allowing them to work on higher frequency ranges.

Figure 13:
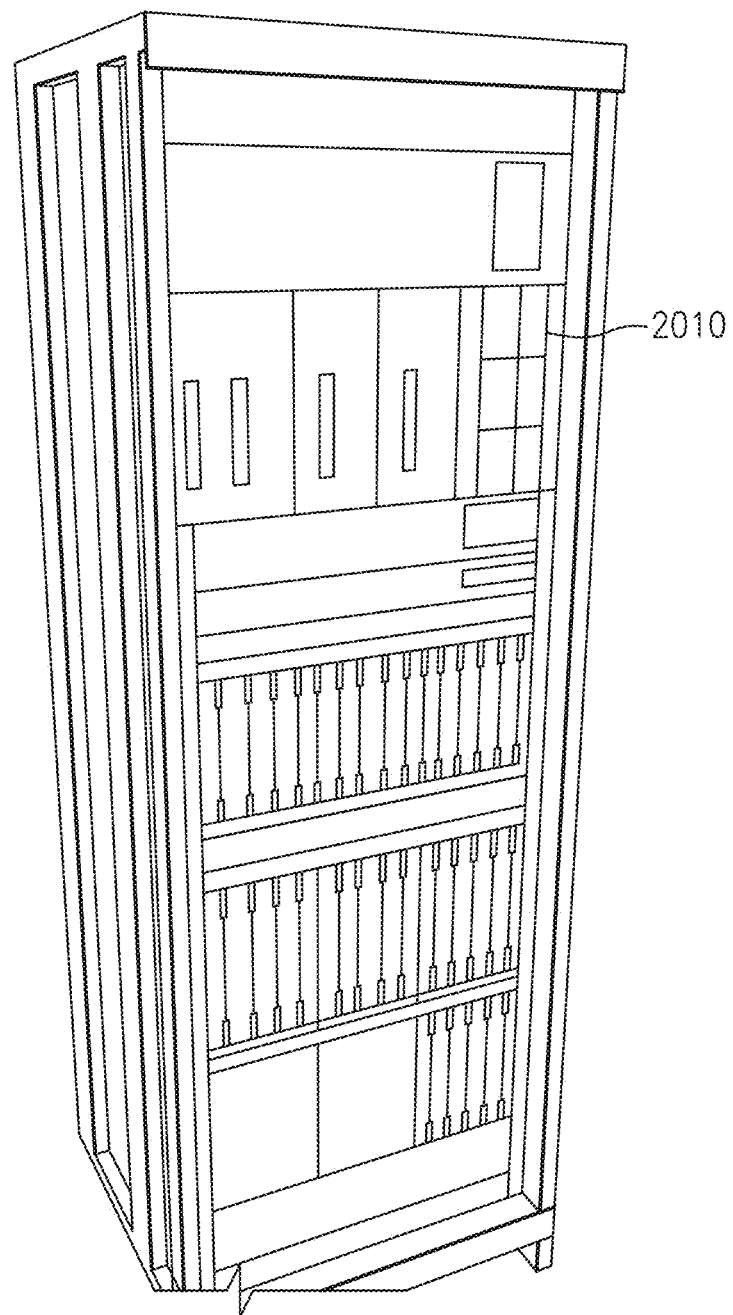
FIG. 13 illustrates housing components of a base station incorporating embodiments of the disclosed material.

FIG. 13 illustrates hardware 2010 that can be used in the electronics building 2004, and can include the components discussed above with respect to FIG. 11. For example, the hardware 2010 can be a base station subsystem (BSS), which can handle traffic and signaling for the mobile systems.

Figure 14:
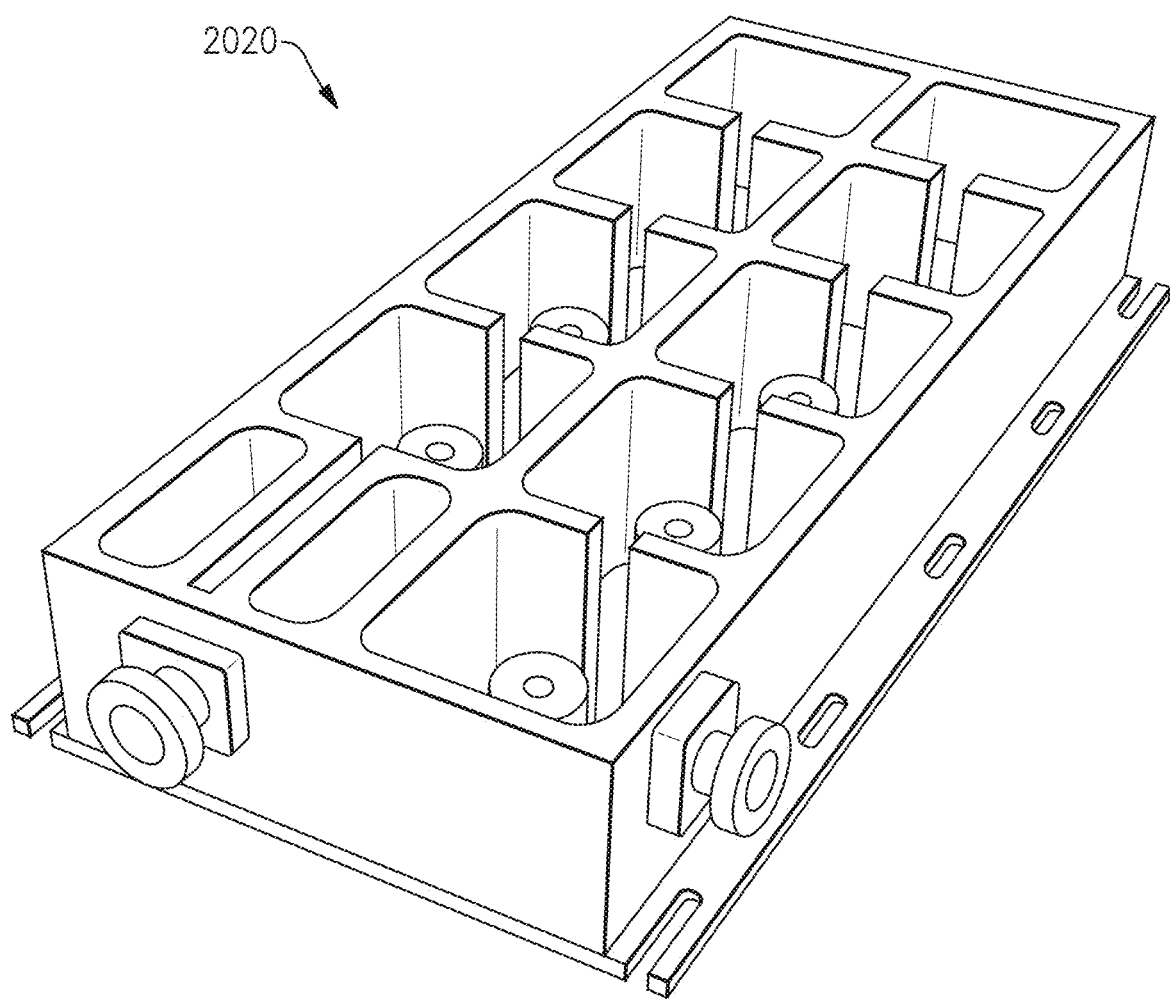
FIG. 14 illustrates a cavity filter used in a base station incorporating embodiments of the material disclosed herein.

FIG. 14 illustrates a further detailing of the hardware 2010 discussed above. Specifically, FIG. 14 depicts a cavity filter/combiner 2020 which can be incorporated into the base station. The cavity filter 2020 can include, for example, bandpass filters such as those incorporating embodiments of the disclosed material, and can allow the output of two or more transmitters on different frequencies to be combined.

From the foregoing description, it will be appreciated that inventive ceramics have advantageous properties and the method of manufacturing is disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A method of making a high Q material comprising:
providing $Ba_3NiTa_2O_9$; and
incorporating one of $Ba_2MgWO_6$, $Ba_8LiTa_5WO_{24}$, $Ba_3LaTa_3O_{12}$, $BaLaLiWO_6$, $Ba_4Ta_2WO_{12}$, $Ba_2La_2MgW_2O_{12}$, $Sr_3LaTa_3O_{12}$, and $SrLaTaO_{12}$ into the $Ba_3NiTa_2O_9$ to form a solid solution having a high Q value of greater than 12000 at about 10 GHz.

2. The method of claim 1 wherein the solid solution does not include tin.

3. The method of claim 1 wherein the solid solution contains at least 95% $Ba_3NiTa_2O_9$.

4. The method of claim 1 wherein the solid solution contains at least 97% $Ba_3NiTa_2O_9$.

5. The method of claim 1 wherein the solid solution has a dielectric constant of at least 25.

6. The method of claim 1 further comprising incorporating MgTa2O6 into the $Ba_3NiTa_2O_9$.

7. The method of claim 1 wherein the solid solution has a Q value of greater than 17000 at about 10 GHz.

8. The method of claim 1 further comprising incorporating the solid solution into a cellular base station.

9. The method of claim 1 further comprising incorporating the solid solution into a millimeter wave filter.

10. The method of claim 1 further comprising incorporating the solid solution into a collision avoidance system.

11. The method of claim 1 further comprising incorporating the solid solution into a resonator or isolator.

12. A method of making a composite material, the method comprising:
providing $Ba_3NiTa_2O_9$; and
incorporating one of $Ba_2MgWO_6$, $Ba_8LiTa_5WO_{24}$, $Ba_3LaTa_3O_{12}$, $BaLaLiWO_6$, $Ba_4Ta_2WO_{12}$, $Ba_2La_2MgW_2O_{12}$, $Sr_3LaTa_3O_{12}$, and $SrLaTaO_{12}$ into the $Ba_3NiTa_2O_9$ to form a composite material having a high Q value of greater than 12000 at about 10 GHz.

13. The method of claim 12 wherein the composite material does not include tin.

14. The method of claim 12 wherein the composite material contains at least 95% $Ba_3NiTa_2O_9$.

15. The method of claim 12 wherein the composite material contains at least 97% $Ba_3NiTa_2O_9$.

16. The method of claim 12 wherein the composite material has a dielectric constant of at least 25.

17. The method of claim 12 further comprising incorporating MgTa2O6 into the composite material.

18. The method of claim 12 wherein the composite material has a Q value of greater than 17000 at about 10 GHz.

19. The method of claim 12 further comprising incorporating the composite material into a cellular base station.

20. The method of claim 12 further comprising incorporating the composite material into a resonator or isolator.

* * * * *